United States Patent [19]

Boecker et al.

[11] Patent Number: 4,693,988

[45] Date of Patent: Sep. 15, 1987

[54] SINGLE PHASE SILICON CARBIDE REFRACTORY

[75] Inventors: Wolfgang D. G. Boecker; Tadeusz M. Korzekwa, both of Lewiston, N.Y.

[73] Assignee: Kennecott Corporation, Cleveland, Ohio

[21] Appl. No.: 880,708

[22] Filed: Jul. 1, 1986

[51] Int. Cl.$^4$ ............................................. C04B 35/56
[52] U.S. Cl. ...................................... 501/89; 501/90;
501/92; 501/97; 501/88; 264/65
[58] Field of Search ...................... 501/88, 89, 90, 92, 501/97; 264/65

[56] References Cited

U.S. PATENT DOCUMENTS

| | | | |
|---|---|---|---|
| 4,004,934 | 1/1977 | Prochazka | 501/90 |
| 4,230,497 | 10/1980 | Schwetz et al. | 501/90 |
| 4,455,385 | 6/1984 | Prochazka | 501/90 |
| 4,551,436 | 11/1985 | Johnson et al. | 264/65 |

*Primary Examiner*—Ferris H. Lander
*Attorney, Agent, or Firm*—Donald C. Studley; Michael L. Dunn

[57] ABSTRACT

The present invention provides a method of pressureless sintering silicon carbide in which the silicon carbide starting material is in the form of a multimodal composition, or mixture, of coarse and submicron particles. The present sinterable silicon carbide mixtures consist of separate fractions of sized particles. Each fraction is present in amounts of from about 5 to about 75% by weight of the mixture, and more preferably from about 10 to about 65% by weight of the mixture. One fraction has a particle size ranging between about 0.21 mm (210 microns) to about 3.4 mm (3400 microns) and preferably the larger particles have a size less than about 2.4 mm. A second fraction has a particle size ranging between about 0.003 mm (3 microns) up to about 0.21 mm. A third fraction has a size less than 0.003 mm, but has an average size less than 1 micron. The present products are produced by sintering particulate silicon carbide in the presence of a sintering aid and a slight excess carbon. Generally, sintering temperatures range from about 1900° C. to about 2300° C. depending upon the sintering atmosphere.

13 Claims, No Drawings

SINGLE PHASE SILICON CARBIDE REFRACTORY

BACKGROUND OF THE INVENTION

The present invention relates to a method for the production of a single phase silicon carbide material useful in making refractory articles or bodies, such as crucibles, firebricks, furnace linings, and the like. The term "single phase" as used herein means that the silicon carbide material does not contain a substantial amount of additional materials, or phases, which remain in the end product. Thus, the basic starting material is substantially entirely silicon carbide and the end product is substantially entirely sintered silicon carbide.

The chemical and physical properties of silicon carbide make it an excellent material for refractory bodies. These properties include excellent oxidation resistance, very high thermoconductivity, low expansion coefficient, high thermal shock resistance and high strength at elevated temperatures.

There are a number of reasons that refractory materials, for example, firebricks, are not produced of a single phase silicon carbide. Among them are: (1) the cost of manufacture; (2) silicon carbide, especially the alpha form, does not easily self-bond without sintering aids or the use of extremely high temperatures, that is temperatures close to sublimation and which involve recrystallization; (3) silicon carbide refractories typically have excessive porosity, or permeable portions, which can be entered by slags or gases resulting in oxidation damage.

Because of such factors, basic refractory articles typically include additional phases, such as, oxide materials and clays, to alleviate, or minimize, such characteristics. Typical basic refractory articles are fabricated of mixtures of coarse silicon carbide grit bonded with carbon or silica with oxide bonding phase such as clays, silicon oxide or silicon oxynitride, or with a nitride phase such as silicon nitride or aluminum nitride. Such articles are produced commercially by reaction sintering or by hot pressing processes. The main disadvantage of such bonded refractory articles is that the bonding material is present in sufficient amounts that a separate phase is produced. Such multi-phase materials are limited by the physical and chemical properties of whichever phase is most susceptible to the temperature or the environment in which they might be used. Further, oxide bonding phases, by themselves, have low corrosive resistance. Bonding materials such a silica and silicon nitride typically produce articles which have excess porosity, offering areas of attack by reactive gases or liquids.

Silicon carbide is produced in the form of grain or fine powder from which larger bodies or articles are formed by subsequent processing. Until recently silicon carbide particles, particularly the alpha phase, were difficult to densify except by the use of onerous hot pressing techniques. U.S. Pat. Nos. 4,041,117; 4,124,667, and 4,238,434 are illustrative of the more recently discovered methods of producing hard, dense silicon carbide products by so-called "pressureless sintering" processes. In such processes a submicron, or ultrafine, silicon carbide powder is mixed with a sintering aid, such as boron or aluminum, and a slight excess of carbon. The mixture is compacted or shaped and subsequently sintered, without pressure, to produce a high density, sintered product. The products of pressureless sintering have found use in engineering applications, for example, as components for gas turbines, as engine parts and as specialty chemical processing equipment. However, heretofore such components have been fabricated entirely from 100% sinterable silicon carbide powder. The silicon carbide starting material utilized in pressureless sintering processes was substantially entirely of a ultrafine size, preferably submicron, and typically ranging from an average particle size between about 0.1 up to a maximum size of about 5 microns. The use of such costly starting materials is directly reflected in the high cost of such fabricated components.

Refractory articles have also previously been fabricated of recrystallized silicon carbide. A process of recrystallizing silicon carbide is described in U.S. Pat. No. 2,964,823. Recrystallization processes are carried out at comparatively high temperatures, typically in the neighborhood of 2500° C., and require a significant expenditure of energy. The recrystallized products have substantially no shrinkage and are characterized by fairly large pore size and a coarse grain system.

SUMMARY OF THE INVENTION

In contrast to such materials, the present silicon carbide materials exhibit shrinkage during sintering and are characterized by a finer and more evenly distributed pore system.

The present substantially entirely oxygen-free refractory products are not only useful as refractory materials, such as, bricks and furnace linings, but are also particularly useful in the production of kiln furniture, such as beams, batts, posts and lav setters. The high strength-to-weight ratio makes the present products particularly useful in kiln car structures which desirably have low weights and low thermal masses. Thus, more space is made available in the kiln thereby improving kiln capacity.

The low weight, low thermal mass properties of the present products result in reduced energy requirements, a lower firing cost and facilitate an increase in productivity by faster firing schedules using quicker turnarounds.

The present materials also exhibit excellent thermal shock resistance, that is, they are substantially uneffected by large and rapid changes in temperature.

The materials exhibit little or no attack by oxidization under kiln type furnace conditions and have smaller pore size than comparable prior art materials.

The present products exhibit exceptional dimensional stability and load-bearing capacity at elevated temperatures, e.g. at working temperatures in the neighborhood of 1400° C. The high temperature stability, i.e. lack of creep at high temperatures, makes the present products aptly suited to use in articles being utilized at high temperatures where dimensional stability is required, for example, furnace rolls or kiln cars.

Because of their single phase characteristics, the present refractory products also exhibit a wide range compatibility with other refractory materials.

The method of producing a single phase silicon carbide article in accordance with the present invention comprises the steps of:
(a) forming a particulate silicon carbide mixture made up of from about 5 to about 75% by weight of the following size fractions:
 (i) particles ranging from about 0.21 mm to about 3.4 mm,
 (ii) particles ranging from less than about 0.21 mm to about 0.003 mm, and (iii) particles less than 0.003 mm in size, having an average particle size of less than one micron.

(b) adding up to about 3.0% by weight based upon the weight of the smallest size fraction of a sintering aid, (c) adding carbon in excess of the stoichiometric amount required to combine with any silica or other oxygen source that may be present, (d) shaping the mixture to form a green body, and (e) firing said shaped body for such time, at such temperature and in such environment as to produce a pressureless sintered silicon carbide article.

DETAILED DESCRIPTION OT THE INVENTION

The present invention provides a method of pressureless sintering silicon carbide in which the silicon carbide starting material is in the form of a multimodal composition, or mixture, of coarse and submicron particles.

The present sinterable silicon carbide mixtures consist of separate fractions of sized particles. Each fraction is present in amounts of from about 5 to about 75% by weight of the mixture, and more preferably from about 10 to about 65% by weight of the mixture. One fraction has a particle size ranging between about 0.21 mm (210 microns) to about 3.4 mm (3400 microns) and preferably the larger particles have a size less than about 2.4 mm. A second fraction has a particle size ranging between about 0.003 mm (3 microns) up to about 0.21 mm. A third fraction has a size less than 0.003 mm, but has an average size less than 1 micron. Such fraction typically ranges in average particle size from about 0.4 micron to about 0.9 micron, and preferably the individual particles fall within a size range of from about 0.1 to about 3.0 micron.

Particularly useful silicon carbide mixtures contain from about 50 to 75% by weight of the coarse fraction (about 0.21 mm to about 3.4 mm and preferably less than 2.4 mm); about 10 to 30% by weight of the medium fraction (about 0.003 mm up to 0.21 mm), and; from about 7 to 50% by weight of the fine fraction (less than about 0.003 mm having an average size less than 1 micron).

The present products are produced by sintering particulate silicon carbide in the presence of a sintering aid and a slight excess carbon. Generally, sintering temperatures range from about 1900° C. to about 2300° C. depending upon the sintering atmosphere.

Preferably, minimal amounts of sintering aids and a slight excess carbon are used to minimize any significant amount of oxide impurities in the finished product. Oxide impurities contribute to the formation of additional phases which would be detrimental to the finished product. The present products are characterized by being substantially entirely oxygen-free. Generally, the amount of residual sintering aids and excess carbon remaining in the finished product is as close to zero as possible, depending upon the application of the refractory material. Typically, less than about 0.5%, and more particularly less than about 0.3% by weight are preferred and useful for most applications.

The amount of sintering aid initially added to the starting silicon carbide mixture generally varies between about 0.15 and about 3.0% by weight of the smallest, submicron fraction. However, to minimize the residual in the final product, it is preferred that amounts of less than 1.5% be employed. Below about 0.15% the sintering process does not effectively proceed and amounts over about 3.0% may adversely affect the oxidation resistance and high temperature strength of the final product. Suitable sintering aids are those known in the art. Preferably, the sintering aids are selected from boron and aluminum and compounds of boron and aluminum. Mixtures of sintering aids may also be used. Sintering aids may be added in the sintering atmosphere.

The amount of carbon, or carbon source material, to be added to the starting silicon carbide mixture also depends on the properties desired in the final product and on the carbon source material. The amount of carbon added is in excess of the stoichiometric amount theoretically required to reduce any oxides present, particularly silica. While minor amounts of silica and silicon may remain and not be detrimental to the final product, the amount of carbon added is preferably in slight excess of the amount required to react with the entire amount of silica and silicon in the starting material.

In accordance with the invention, after the mixture of silicon carbide, sintering aids and carbon or carbonaceous material is prepared, it is shaped. Preferably a temporary binder, such as a water solution of polyvinyl alcohol, is added to provide green strength to the shaped article. The binder may also provide a carbon source. The shaped body is produced using techniques commonly employed in molding or casting of ceramics or other ceramic fabrication methods. The shaped or green body typically has a density between about 55% and about 80% of the theoretical density of silicon carbide. Preferably, the green body has a density of at least 60% of theoretical and more preferably greater than 70% of theoretical.

The shaped body is then fired for such time, at such temperature, and in such environment to produce a sintered, single phase, silicon carbide body, or article, having a density at least about 65% of theoretical, and more preferably greater than 70% of theoretical. Densities over about 85% may be obtained. Typically, the density of the sintered products of the present invention range from about 75 to about 85% of theoretical.

The sintered products of the present invention consist essentially of silicon carbide and may contain up to about 2.0% by weight of residual carbon and preferably less than about 0.5% of residual sintering aid.

The hard, dense products of the present invention are produced from a particulate silicon carbide starting material having particle sizes ranging from submicron to about 3.4 mm, and more preferably up to 2.4 mm. More particularly, the silicon carbide starting material contains from about 5 to about 75% and preferably from about 10 to about 65% by weight of the following fractions:

1. particles having sizes ranging between about 0.21 mm and about 3.4 mm, more preferably up to 2.4 mm,
2. particles having sizes ranging between about 0.003 mm to less than 0.21 mm, and
3. particles having a size less than 0.003 mm having an average particle size less than one micron.

Although the silicon carbide starting material is preferably of the alpha phase, it may be in the form of alpha or beta phase or mixtures thereof and may contain minor amounts of amorphous material. The silicon carbide starting material may be suitably obtained from available commercial processes. For example, commercially produced vapor phase reacted material, typically the beta form of silicon carbide, is generally produced in very fine particle size and is useful as a component of the smaller fraction. Silicon carbide material produced by the Acheson process, principally the alpha form of silicon carbide, and being readily available, may be used. In such case, the larger material may suitably be milled until sufficient amounts of finer silicon carbide materials useful in the desired fractions are obtained. Particles of the desired sizes may be separated from a milled silicon carbide material by conventional means, such as screening or water sedimentation.

In a preferred embodiment the silicon carbide feed, or starting, material is treated with acid (hydrochloric, hydrofluoric and nitric acids, or mixtures thereof) to remove impurities which could interfere with the sintering operation, for example, metal and/or oxide particles from the milling operation.

Sintering aids in amounts of up to about 3.0% by weight of the finer, submicron, fraction of silicon carbide starting material may be utilized. Generally, the sintering aids are added in amounts of between about 0.15 and about 1.0% by weight of the starting submicron material, preferably amounts less than 0.5% by weight are used. Suitable sintering aids may be selected from those known in the art, more particularly in the patents cited above. Boron and aluminum, and compounds thereof, or mixtures of such elements and compounds are preferred. Boron is the most preferred. Techniques describing the use of boron sintering aids or using a boron sintering atmosphere are described in U.S. Pat. No. 4,179,299 and in U.S. Pat. No. 4,238,434. If the sintering aid is particulate, it is preferred that the particle size be less than 30 microns, and more preferably range between about 0.1 to about 10.0 microns.

The amount of carbon or organic material utilized in the mixture depends upon the carbon source material and the amount of oxide materials that are present. The final sintered product may contain up to about 2.0% by weight of free or uncombined carbon. The carbon may be produced in situ by carbonization of organic material used as a binder in the shaping process. In any case, the amount of carbon added is in slight excess of the theoretical stoichiometric amount required for combining with any silica or other oxygen source materials, which may be present in the starting material. In this manner, sufficient carbon is supplied so that the silica or silicon is reacted to form silicon carbide. The present starting materials may include a minor percent by weight of silica or silicon provided sufficient carbon is added to react with such silica or silicon.

The mixture of silicon carbide starting material, sintering aid and carbon may be produced by any suitable mixing means. Temporary binders may be added with the mixture. A temporary binder typically is added in an amount from about 1 to about 10% by weight of the mixture. A mixture comprised of about 10 parts by weight of polyvinyl alcohol to about 90 parts of water is aptly suited to use as a binder. Other binders may be used, for example, polyethylene glycol, coal tar pitch, long chain fatty materials, such as metallic stearates, sugars, starches and alginates. Many of these materials are capable of functioning both as a temporary binder material and as a carbon source material in the mixture. The mixture is dried and subsequently shaped to produce a green body having a density of at least 55% of theoretical and typically between about 65 to about 80% of theoretical.

The shaping may be carried out by a variety of known ceramic forming techniques. For example, by extrusion, injection molding, transfer molding, slip casting, cold pressing, isostatic pressing or by compression. Typically compression molding is used. In compression molding preferred pressures are between about 4,000 and about 40,000 psi, with between about 5,000 and about 15,000 psi being a preferred range.

If a temporary binder, such as polyvinyl alcohol is used, the binder may suitably be cured by heating the shaped body at a temperature between about 80° and about 250° C. for a period from about one to about four hours. The shaped body is then fired to accomplish the densification necessary to produce the sintered body of the invention.

Typically, firing requires exposure to temperatures between about 1900° to about 2300° C. for a period between about 20 and about 60 minutes using an inert atmosphere or a vacuum. Lower temperatures are generally inoperative and higher temperatures may cause sublimation of the silicon carbide material. The firing step may be carried out in conventional tube furnaces wherein the shaped body is passed through a hot zone in the furnace and is thereby exposed to the desired temperature for the desired time. As used herein, the term "firing" includes the use of an electrical resistance, induction heating, or a high temperature plasma gas to raise the temperature of the shaped body to sintering temperature. More particularly, heating may be by radiation from an electrically heated element or by passing an electrical current directly through the shaped body.

The firing step accomplishes a "pressureless sintering" of the shaped body. The term "pressureless sintering" as used herein means no mechanical pressure is applied to the object being fired to enhance the sintering process. The pressureless sintering operation is carried out under conditions which the object to be sintered is surrounded with up to about slightly above one atmosphere of an inert gas, a reducing gas, a vacuum or nitrogen. Reducing gases include hydrogen; inert gases include the nobel gases, such as argon, helium and neon. Various combinations of atmospheric conditions may be used, as well as varying partial pressures. Although nitrogen may react with the silicon carbide starting material in a minor degree, the composition of the sintered body is usually not noticeably changed. The use of nitrogen, however, may require an increase in the necessary sintering temperature of about 150° C. Thus if nitrogen is utilized as the surrounding atmosphere, a preferred sintering temperature is from about 2200° to about 2300° C. In the other gases, particularly the inert gases such as argon, helium or neon, a preferred sintering temperature is from about 2060° C. to about 2200° C. Firing may also be carried out under reduced pressure or in a vacuum, i.e., without a surrounding atmosphere.

The following examples are included to better illustrate the present invention. They should not be interpreted as limiting the invention to particular materials, conditions, treatment or ranges. All percentages in the examples are percent by weight.

EXAMPLES

EXAMPLE I

A mixture of alpha silicon carbide grain and powders of various sizes was separated into specific size fractions. A first fraction having a size ranging from about 0.21 to about 2.4 mm was obtained by separating particles passing a U.S. Standard No. 8 screen and being retained on a U.S. Standard No. 70 screen. A second fraction having a size greater than about 0.003 mm and less than 0.21 mm and a third fraction less than 0.003 mm in size and having an average size less than one micron were obtained by milling larger particles and subsequently separating and recovering particles of the desired size. The finer fractions were treated with HF and $HNO_3$ to remove surface impurities, water washed and dried. The coarser fraction was treated with HCl, water washed and dried. The fractions were then blended together using acetone with 0.65% by weight of finely divided $B_4C$ based upon the weight of the submicron fraction of silicon carbide and about 5.0% by weight of phenolic resin, based upon the weight of the submicron fraction of silicon carbide. The phenolic resin source was a product designated as B-178 obtained from the Varcum Chemical Division of Reichhold Chemicals, Inc. This material has a char yield of about 40%. The mixture was then dried and subsequently pressed into the shape of an article by compression molding utilizing a pressure of 5,000 psi. The molded article,-or green body, was then heated at about 100° C. for 3 hours to cure the phenolic resin components. The density of the green body was determined. The green body was then sintered at 2150° C. in an Argon atmosphere with a thirty minute hold to obtain a sintered product.

Runs 1, 2, 3 and 4 in the table below were carried out using the above procedure.

TABLE I

| Run | Fraction Size (% by weight) .21 mm to 2.4 mm | 0.003 mm to 0.21 mm | Submicron (Average Size less than 1 micron) | Green Body Density (% of Theoretical) | Sintered Body Density (% of Theoretical) |
|---|---|---|---|---|---|
| 1 | 67.3 | 22.7 | 10 | 72.2 | 78.4 |
| 2 | 59.4 | 20.6 | 20 | 73.1 | 76.7 |
| 3 | 52.0 | 18.0 | 30 | 71.4 | 76.7 |
| 4 | 44.6 | 15.4 | 40 | 67.6 | 76.2 |

The sintered silicon carbide articles produced by the present invention generally have linear shrinkages of from about 0.5 to about 6% of the shaped body. The articles are comprised essentially of silicon carbide, preferably predominantly of an alpha phase silicon carbide. The sintered article may have a minor amount of residual, or excess, sintering aid and free, or uncombined, carbon therein. Ideally, the finished products contain no residual sintering aid or free carbon. As a practical matter, some residual sintering aid or carbon will be present, but the amounts are desirably minimal. The end use of the products is an important factor, for example, if the finished products are to be utilized in an oxidizing environment, the combined amounts of residual sintering aid and carbon is preferably as low as possible, i.e., well under 0.5% by weight. If the finished products are to be utilized in a non-oxidizing environment the combined amounts of residual sintering aid and carbon, while preferably minimal, may range upward to about 5.0% without adverse effect. In general, the total amounts of residual sintering aid and carbon preferably range from about 0.1 to about 3.0% by weight.

EXAMPLE II

This example was carried out using the procedure of Example I, except particle size and size distribution of the particulate silicon carbide starting material was adjusted to maximize packing density. The size distribution for optimum packing was calculated using the method proposed by Andreasen (G. Herden, *Small Particle Statistics*, 2nd Ed., Butterworths, London, 1960, pp. 188–9).

The coarse silicon carbide fraction having a size ranging from about 0.21 to about 2.4 mm comprised 63.4 weight percent of the starting material and had the following size distribution:

| Screen Size (US Standard mesh) | Average Particle Size (mm) | Percent By Weight of Total SiC Starting Material |
|---|---|---|
| −8 + 10 | 2.2 | 3.4 |
| −10 + 14 | 1.7 | 9.6 |
| −14 + 18 | 1.2 | 10.7 |
| −18 + 25 | 0.85 | 10.2 |
| −25 + 35 | 0.60 | 9.7 |
| −35 + 45 | 0.43 | 7.5 |
| −45 + 60 | 0.30 | 6.6 |
| −60 + 80 | 0.21 | 5.7 |
| | TOTAL | 63.4 |

The medium sized silicon carbide fraction having a size ranging from less than about 0.21 to about 0.003 mm comprised 28.8 weight percent of the starting material and had the following distribution:

| Size US Standard mesh | Average Particle Size (mm) | Percent By Weight of Total SiC Starting Material |
|---|---|---|
| −80 + 120 | 0.15 | 4.9 |
| −120 + 170 | 0.11 | 4.3 |
| −170 + 230 | 0.075 | 3.7 |
| −230 + 325 | 0.053 | 3.2 |
| −325 + 500 | 0.034 | 3.5 |
| (about 500)* | 0.025 | 2.0 |
| (about 1300)* | 0.0133 | 3.5 |
| (about 1900)* | 0.0080 | 2.2 |
| (about 2600)* | 0.0052 | 1.5 |
| | TOTAL | 28.8 |

*calculated mesh size

The fine silicon carbide fraction (submicron size) comprised 7.8 weight percent of the starting material.

Three runs were made using the above-identified silicon carbide starting material. The molding and sintering procedure described used in Example I was utilized. The following results were obtained:

| Run | Green Body Density (% of Theoretical) | Sintered Body Density (% of Theoretical) | Open Porosity (Volume Percent) |
|---|---|---|---|
| 1 | 77.9 | 80.7 | 16.8 |
| 2 | 73.2 | 74.5 | 23.6 |
| 3 | 77.9 | 81.1 | 16.7 |

While the present invention has been described in some detail, it should be understood that it is not to be limited to the specific examples of sintering compositions or methods and that various modifications may be made by one of ordinary skill in the art without departing from the spirit and scope therof.

What is claimed is:

1. The method of producing a single phase silicon carbide article comprising the steps of:
   (a) forming a particulate silicon carbide mixture made up of the following size fractions:

(i) particles ranging from about 0.21 mm to about 3.4 mm,
(ii) particles ranging from less than about 0.21 mm to about 0.003 mm, and
(iii) particles less than 0.003 mm in size, having an average particle size of less than one micron each of said fractions being present in the mixture in amounts of from about 5 to about 75% by weight, the sum of said fractions equaling 100%, (b) adding up to about 3.0% by weight based upon the weight of the smallest size fraction of a sintering aid, (c) adding carbon in excess of the stoichiometric amount required to combine with any silica or other oxygen source that may be present, (d) shaping the mixture to form a green body, and (e) firing said shaped body for such time, at such temperature and in such environment as to produce a pressureless sintered silicon carbide article.

2. The method of claim 1 wherein said particles range up to 2.4 mm.

3. The method of claim 1 wherein the amount of sintering aid added is between about 0.15 and about 3.0 percent by weight of said smallest size fraction.

4. The method of claim 1 wherein the amount of sintering aid added is less than about 1.0% by weight of said smallest size fraction.

5. The method of claim 1 wherein the sintering aid is selected from boron, aluminum, compounds thereof or mixtures thereof.

6. The method of claim 5 wherein the sintering aid is boron or compounds thereof.

7. The method of claim 1 wherein the size of the particles in the smallest fraction average between about 0.4 and about 0.9 micron.

8. The method of claim 1 wherein the shaping is by compression at a pressure between about 4,000 and 40,000 psi.

9. The method of claim 1 wherein the green body is fired from about 20 to about 60 minutes at a temperature of from 1900° to 2300° C. in an atmosphere of argon, nitrogen or mixtures thereof.

10. The method of claim 8 wherein the atmosphere is argon.

11. The method of claim 1 wherein the density of the green body is at least 65% of theoretical density.

12. The method of claim 1 wherein the sintered silicon carbide article has a density at least about 75% of theoretical.

13. The silicon carbide article produced by the method of claim 1.

* * * * *